(12) United States Patent
Yoshida (10) Patent No.: US 7,223,190 B2
(45) Date of Patent: May 29, 2007

(54) HYDRAULIC CHAIN TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/304,480

(22) Filed: Dec. 15, 2005

(65) Prior Publication Data

US 2006/0166769 A1 Jul. 27, 2006

(30) Foreign Application Priority Data

Jan. 25, 2005 (JP) .............................. 2005-017133

(51) Int. Cl.
F16H 7/08 (2006.01)
F16H 7/22 (2006.01)

(52) U.S. Cl. ...................... 474/110; 474/109

(58) Field of Classification Search ............... 474/110, 474/109
See application file for complete search history.

(56) References Cited

U.S. PATENT DOCUMENTS

| | | | | |
|---|---|---|---|---|
| 3,223,426 A | * | 12/1965 | Reid | 277/647 |
| 3,911,957 A | * | 10/1975 | McQueen | 137/625.48 |
| 5,700,213 A | * | 12/1997 | Simpson et al. | 474/110 |
| 5,707,309 A | * | 1/1998 | Simpson | 474/110 |
| 5,781,375 A | * | 7/1998 | Honma | 360/99.12 |
| 5,799,953 A | * | 9/1998 | Henderson | 277/554 |
| 6,361,458 B1 | * | 3/2002 | Smith | 474/109 |
| 6,935,978 B2 | | 8/2005 | Hayakawa et al. | |
| 2001/0003279 A1 | * | 6/2001 | Brandl et al. | 123/90.31 |

FOREIGN PATENT DOCUMENTS

| | | |
|---|---|---|
| EP | 1 197 679 A1 | 4/2002 |
| GB | 2 414 777 A | 12/2005 |
| JP | 2003-329091 | 11/2003 |
| JP | 2004-138152 | 5/2004 |
| JP | 2005-344887 | 12/2005 |

OTHER PUBLICATIONS

U.S. Appl. No. 11/083,411, filed on Mar. 18, 2005.

* cited by examiner

*Primary Examiner*—Richard Ridley
*Assistant Examiner*—James Pilkington
(74) *Attorney, Agent, or Firm*—Howson & Howson LLP (57) ABSTRACT

In a hydraulic chain tensioner for an engine timing drive, an annular groove is formed on an outer circumferential surface of a plunger, and a friction ring is disposed in the groove. The friction ring is composed of an external resin ring and an internal steel ring incorporated into the inside of the resin ring. The friction ring is fitted into the annular groove of the plunger with a predetermined axial clearance. It allows the tensioner to operate with good responsiveness during normal engine operation, but resists excessive slack in the chain, and prevents backlash and fluttering, during engine start-up.

1 Claim, 11 Drawing Sheets

HYDRAULIC CHAIN TENSIONER

CROSS-REFERENCE TO RELATED APPLICATION

This application claims priority on the basis of Japanese application 2005-017133, filed Jan. 25, 2005. The disclosure of Japanese application 2005-017133 is hereby incorporated by reference.

FIELD OF THE INVENTION

This invention relates to a hydraulic chain tensioner, suitable, for example, to maintain tension in the slack side of an internal combustion engine timing chain.

BACKGROUND OF THE INVENTION

A conventional hydraulic chain tension comprises a housing, a bottomed hollow cylindrical plunger slidable in a plunger-accommodating hole formed in the housing, a plunger biasing spring, which biases the plunger in a protruding direction, a high-pressure oil chamber formed by the plunger-accommodating hole and the plunger, and a check valve, incorporated into the housing, which allows oil to flow into the high-pressure oil chamber but blocks backflow of the oil.

In this type of the hydraulic chain tensioner, chain tension is held at a prescribed level by using a spring-biased plunger to exert a chain tensioning force, and by buffering the pressing force applied to the plunger from the chain by oil pressure in a high-pressure oil chamber formed by the plunger and the housing.

If the engine is started while the high-pressure oil chamber is insufficiently filled with oil (for example, if the engine is started after having been out of operation for a long time), it is difficult to maintain tension in the timing chain over the time interval during which oil, supplied from an oil pump, fills the high-pressure oil chamber of the tensioner. During this interval, if the chain exerts a significant pushing force on the plunger of the tensioner, backlash and fluttering of the chain can occur.

To address this problem, a chain tensioner, which can restrict retracting movement of the plunger, has been proposed in U.S. Pat. No. 6,935,978. The proposed tensioner comprises a bottomed cylindrical housing, a plunger slidable in the housing, a biasing spring, which exerts a force urging the plunger in the protruding direction, a plurality of engagement grooves formed on the outer circumference of the plunger, a first stopper formed on an inner circumference of the housing, and register rings, which are elastically expandable and retractable, and which engage the engagement grooves, to restrict backward movement of the plunger by causing an engagement groove to engage with the first stopper through register rings.

In my U.S. patent application Ser. No. 11/083,411, filed Mar. 18, 2005, I describe a hydraulic chain tensioner having a plunger, a housing, a biasing spring, and a check valve, in which backward movement of the plunger is restricted by an expansible C-shaped ring, disposed in an annular groove formed on the outer circumference of the plunger, with predetermined clearances in the groove width direction and in the radial direction between the ring and the groove bottom The chain tensioner proposed in U.S. Pat. No. 6,935,978 includes a plurality of engagement grooved on the outer circumference of the plunger. Furthermore, a first stopper is formed on an inner circumference of the housing. To form the first stopper, an annular guide groove is formed on an inner circumferential surface of the housing. That is, the first stopper and the second stopper are respectively formed on both axial ends of the guide groove. Taking accuracy and other factors into consideration, significant manufacturing costs are incurred in forming the annular guide groove on the inner circumferential surface of the housing. Furthermore, since this chain tensioner restricts backward movement of the plunger by causing one of a plurality of engagement groove to engage the first stopper through a register ring, difficulties are encountered in designing conditions such as the shape and material of the register ring.

The ring type hydraulic tensioner disclosed in the specification of my application Ser. No. 11/083,411 prevents backlash and fluttering of a chain upon engine start-up when the hydraulic tensioner is not sufficiently filled with oil, by taking advantage of friction between and expansible C-shaped ring and the inner circumferential wall of a plunger-accommodating hole in a tensioner housing. However, because the C-shaped ring is made of steel, the inner circumferential wall of the plunger-accommodating hole can become worn by sliding friction. As wear of the inner circumferential wall of the plunger-accommodating hole proceeds, the clearance between the inner circumferential surface of the plunger-accommodating hole and the outer circumferential surface of the plunger is increased, and the increase of this clearance impairs the holding capability of the ring. As a result, backlash or fluttering of the chain, although prevented initially, can occur eventually. If an aluminum alloy is adopted as the housing material for the purpose of weight reduction, frictional wear of the inner circumferential surface of the plunger-accommodating hole proceeds rapidly. Furthermore, powder generated by wear of the inner circumferential surface of the plunger-accommodating hole accumulates in the vicinity of the oil supply passage or the check valve and affects oil inflow, which can also cause backlash and fluttering of the chain.

An object of the invention, therefore, is to provide a hydraulic chain tensioner, which can reduce friction on the inner circumferential surface of the plunger-accommodating hole of a hydraulic chain tensioner, and which can reduce manufacturing costs and simplify tensioner design.

SUMMARY OF THE INVENTION

The hydraulic chain tensioner in accordance with the invention comprises a housing having a plunger-accommodating hole with a cylindrical wall, and a hollow cylindrical plunger slidable in the plunger-accommodating hole and protruding therefrom. A plunger-biasing spring, urges the plunger in the protruding direction. The plunger and the plunger-accommodating hole form a high pressure oil chamber, and a check valve in the housing allows oil to flow from a source of oil under pressure into the high-pressure oil chamber but blocks reverse flow of oil. An annular groove, formed on the outer circumferential surface of the plunger, is situated within the interior of the plunger-accommodating hole and is opposed to the cylindrical wall of the hole. A friction ring, composed of a resin ring and a steel ring incorporated into the inside of the resin ring, is fitted into the annular groove with an axial clearance. The outer circumferential surface of the resin ring is pressure-welded to the cylindrical wall of the plunger-accommodating hole.

When the tensioner is incorporated into the timing drive of an internal combustion engine to control tension in the timing chain, different conditions exist in normal operation and at engine start-up. During normal engine operation, the extent of forward and backward movement of the plunger is small, and within the range permitted by the axial clearance provided between the groove and the friction ring. Consequently the plunger can move forward and backward while the friction ring remains in fixed relationship to the wall of the plunger-accommodating hole of the tensioner housing. Under these conditions, the tensioner responds readily to variations in chain tension.

Upon engine start-up, however, retracting movement of the plunger is restricted by frictional resistance between the outer circumferential surface of the resin ring and the wall of the plunger-accommodating hole. Consequently, large amounts of slack in the chain are avoided, and backlash and fluttering of the chain are suppressed.

Since the restriction of retracting movement of the plunger upon engine start-up is a result of friction between the resin ring, and the wall of the plunger-accommodating hole, restriction of retracting movement of the plunger is superior than the restriction achieved by the mechanism described my application Ser. No. 11/083,411.

Even if the housing is composed of an aluminum alloy, in which case the clearance between the plunger and the wall of the plunger-accommodating hole will eventually increase due to friction, the holding force, by which the ring is held against axial movement relative to the wall of the plunger-accommodating hole, is maintained over a long time.

In the conventional chain tensioner described in U.S. Pat. No. 6,935,978, plural grooves are formed on the outer circumferential surface of the plunger and an annular guide groove, forming a first stopper, must be formed on an inner circumferential surface to restrict retracting movement of the plunger. However, since, in the present invention, it is only necessary to form a single annular groove on the outer surface of the plunger, a significant reduction in manufacturing cost can be realized.

Moreover, because the conventional chain tensioner restricts retraction of the plunger by engagement between a groove and a first stopper through a register ring, design of the tensioner parameters, such as the shape and material of the register ring, requires study. On the other hand, because retracting movement of the plunger of the present invention is restricted by frictional resistance between the outer circumferential surface of the resin ring and the wall of the plunger-accommodating hole, design of the parts for restricting retracting movement of the plunger is greatly simplified.

DETAILED DESCRIPTION OF THE PREFERRED EMBODIMENT

Figure 1:
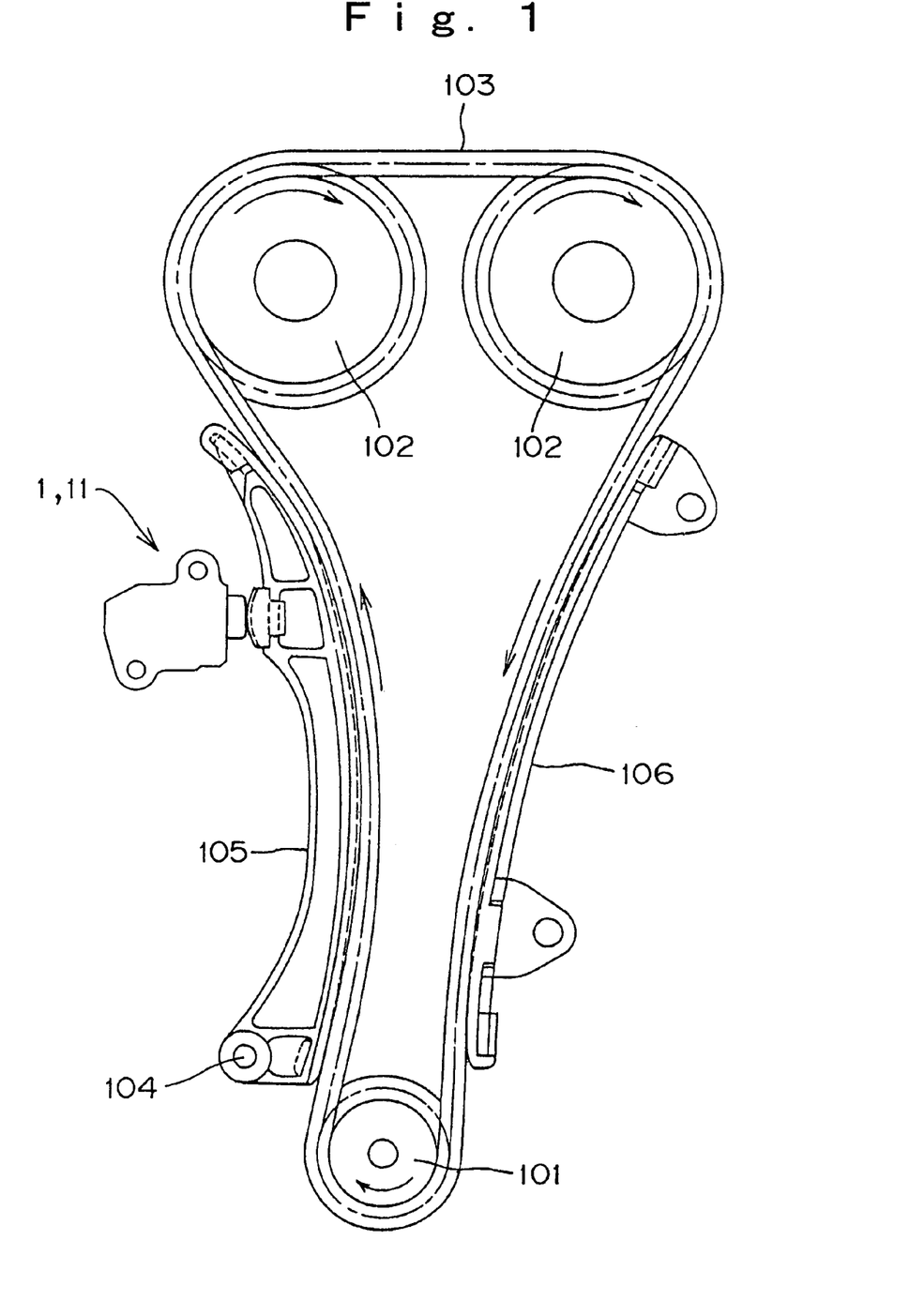
FIG. 1 is a schematic diagram of an engine timing transmission incorporating a tensioner in accordance with the invention.

The hydraulic tensioner 1 shown in FIG. 1, is attached to an engine body (not shown) by inserting mounting bolts into mounting holes 2b (FIG. 2) in the tensioner housing 2, which is preferably composed of an aluminum alloy for weight reduction. The tensioner housing is mounted adjacent the slack side of chain 103, which is engaged with a driving sprocket 101 on the engine crankshaft and driven sprockets 102 on the engine camshafts. The tension side of the chain slides on a fixed guide 106.

Figure 2:
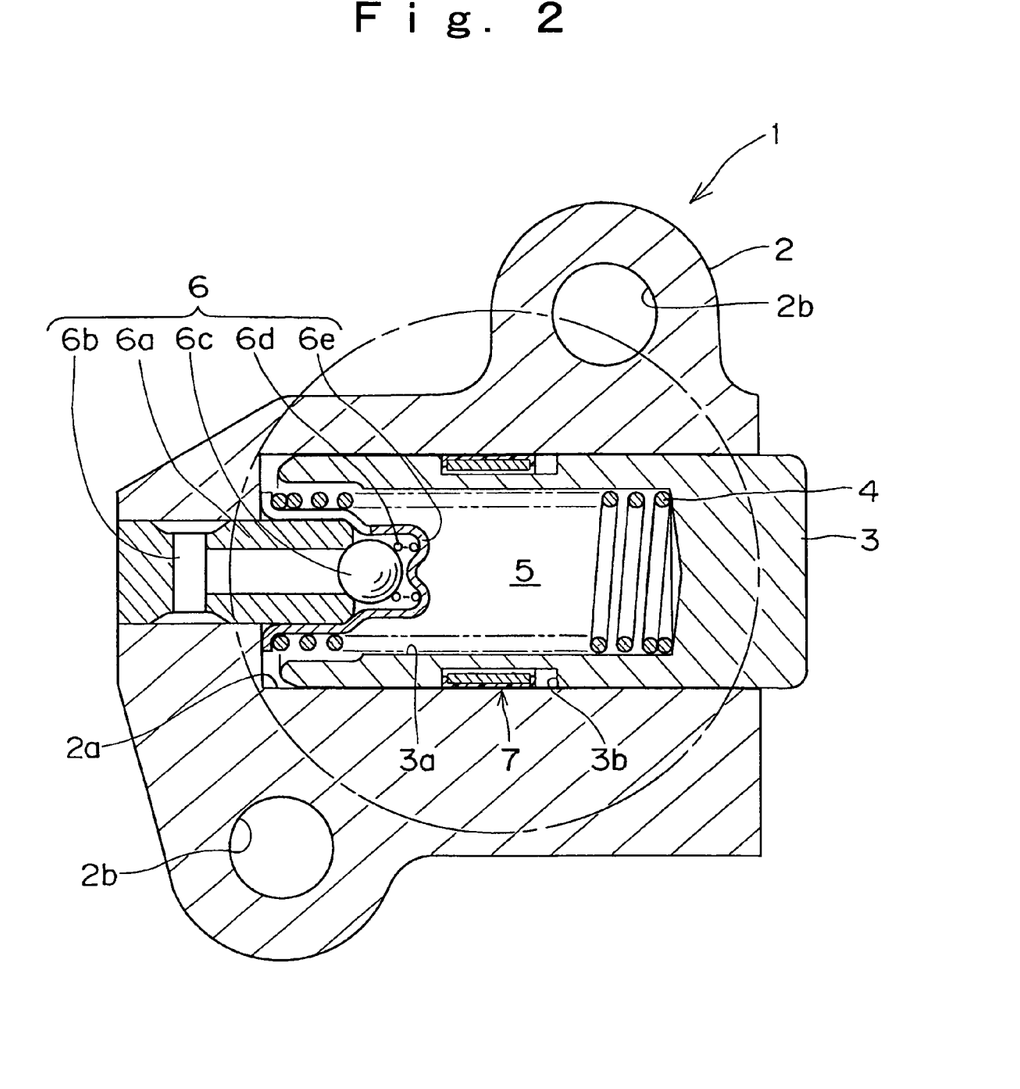
FIG. 2 is a cross-sectional view of a hydraulic chain tensioner in accordance with a first embodiment of the invention.

As shown in FIG. 2, a plunger 3 is slidable in a plunger-accommodating hole 2a in the housing, and protrudes from a front side of the housing. The plunger applies tension to the slack side of the chain 3, through a pivoted guide lever 105, by pressing against the back of the lever at a location remote from a shaft 104 on which the lever is pivoted. The chain slides along a chain-engaging surface of the guide lever. Arrows in FIG. 1 indicate the directions of sprocket rotation and chain movement.

As shown in FIG. 2, the plunger and the housing together define a high-pressure oil chamber 5. Oil is supplied under pressure from an oil pump in the engine (not shown) through a check valve 6, which allows oil to flow into the oil chamber while blocking reverse flow. The oil, which leaks through the small clearance between the plunger and the wall of the plunger-accommodating hole, produces a damping effect when an impact urges the plunger in the retracting direction.

The plunger 3 is hollow, having a cylindrical inner wall 3a and a bottom against which a plunger-biasing spring 4 presses. The spring 4 is disposed between the bottom of the plunger-accommodating hole 2a and the bottom of the hollow interior of plunger 3, and urges the plunger 3 in the protruding direction.

The plunger has a generally cylindrical outer surface, with an annular groove 3b. The annular groove fits a friction ring 7, which sets limits on the range of free movement protruding and retracting movement of the plunger.

The check valve 6, which is provided at the bottom potion of the plunger-accommodating hole 2a, comprises a ball seat 6a, press-fit into the bottom of the plunger-accommodating hole 2a, a check ball 6c, a check ball-biasing spring 6d, and a retainer 6e, which supports the check ball-biasing spring 6d. Oil flows into the high-pressure oil chamber 5 through a radial oil supply passage 6b in the ball seat 6a, and through an central axial passage in the ball seat.

Figure 4:
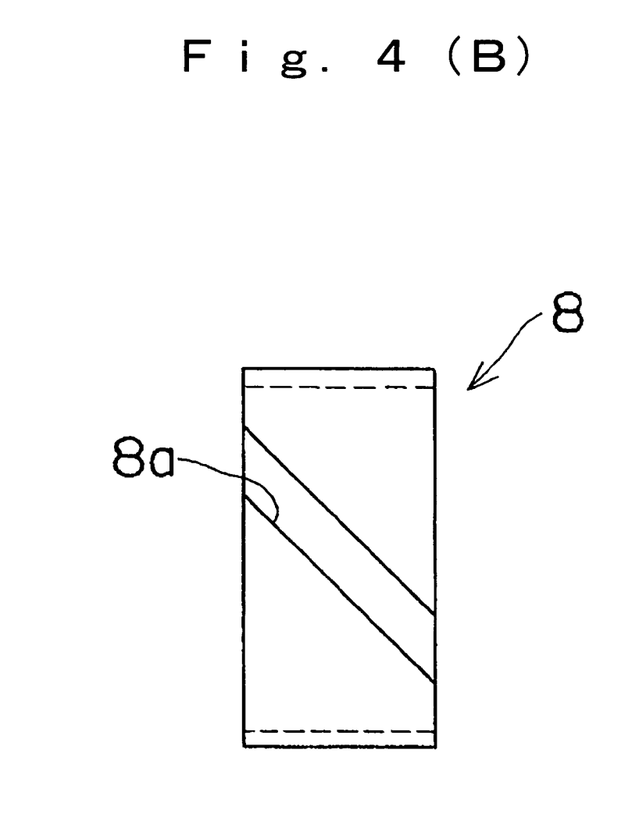
FIG. 4(A) is an end view of a steel ring used in the friction ring in FIG. 3.
FIG. 4(B) is a side elevational of the steel ring of FIG. 4(A)
Figure 5:
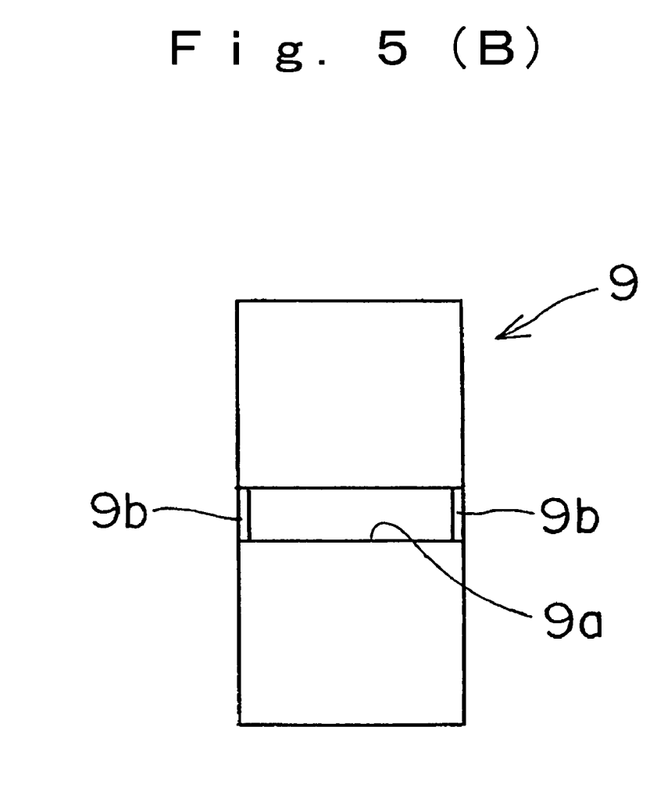
FIG. 5(A) an end view of a resin ring used in the friction ring in FIG. 3.
FIG. 5(B) is a side elevational view of the resin ring of FIG. 5(A)

The friction ring 7 is composed of a steel ring 8 (FIGS. 4(A) and 4(B), and a resin ring 9 (FIGS. 5(A) and 5(B)).

Figure 3:
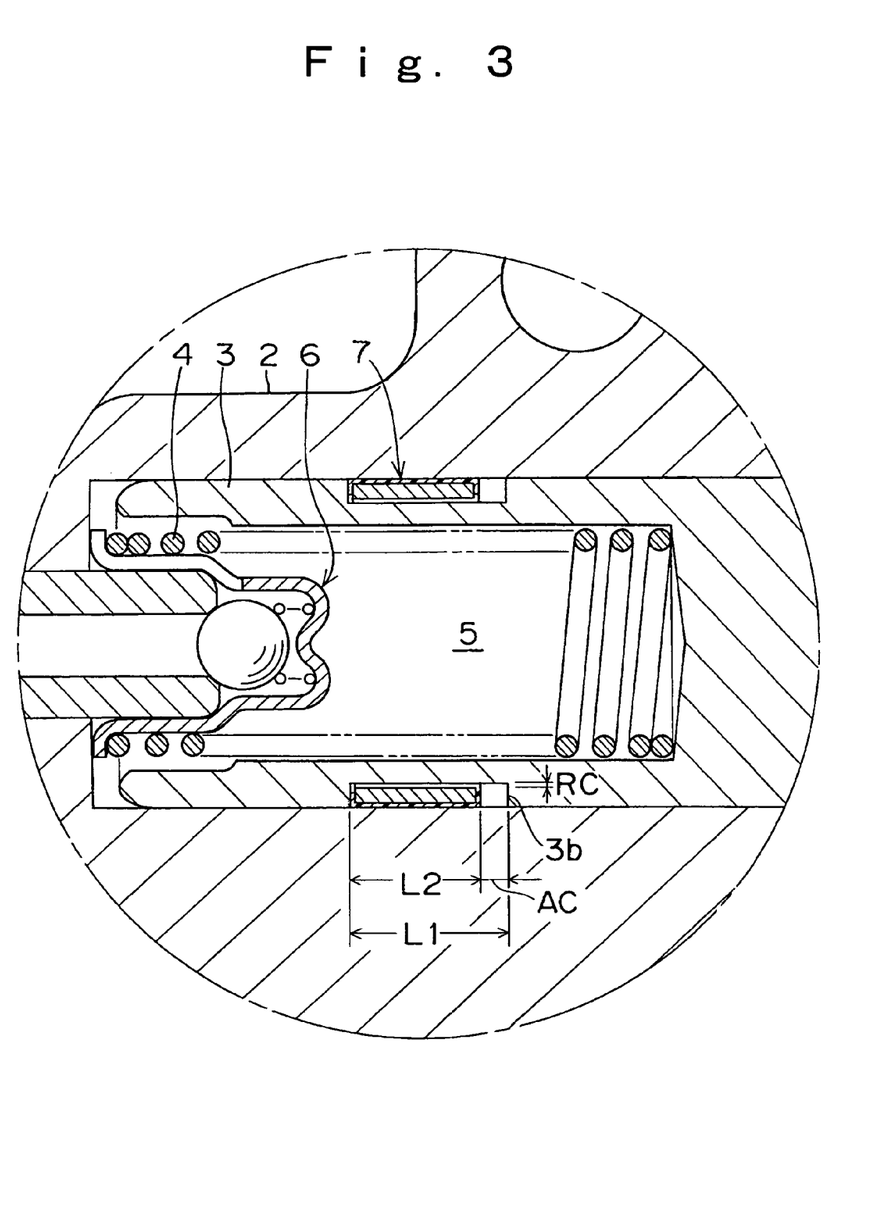
FIG. 3 is an enlarged cross-sectional view of a portion of the tensioner outlined by a circle shown as a broken line in FIG. 2, showing a friction ring.

As shown in FIG. 4(B), the steel ring 8 has an oblique slot 8a at one position as shown in FIGS. 4(A) and 4(B), and has a rectangular cross-section, as seen in FIG. 3. The steel ring 8 is generally of cylindrical shape, and exhibits elasticity so that it tends to expand radially toward a condition in which its inner diameter is greater than the bottom diameter of the annular groove 3b formed in the outer surface of the plunger 3. The ring 8 can be formed from any of various spring steels, selected for appropriate spring properties.

As shown in FIGS. 5(A) and 5(B), the resin ring 9 has a generally cylindrical shape, and is formed with a thin wall with inwardly extending collars 9b at both ends. Further, the resin ring 9 has an axial slot 9a, which allows its diameter to increase. The material of the resin ring 9 can be selected from any of a large variety of engineering plastics having appropriate friction coefficients.

Figure 6:
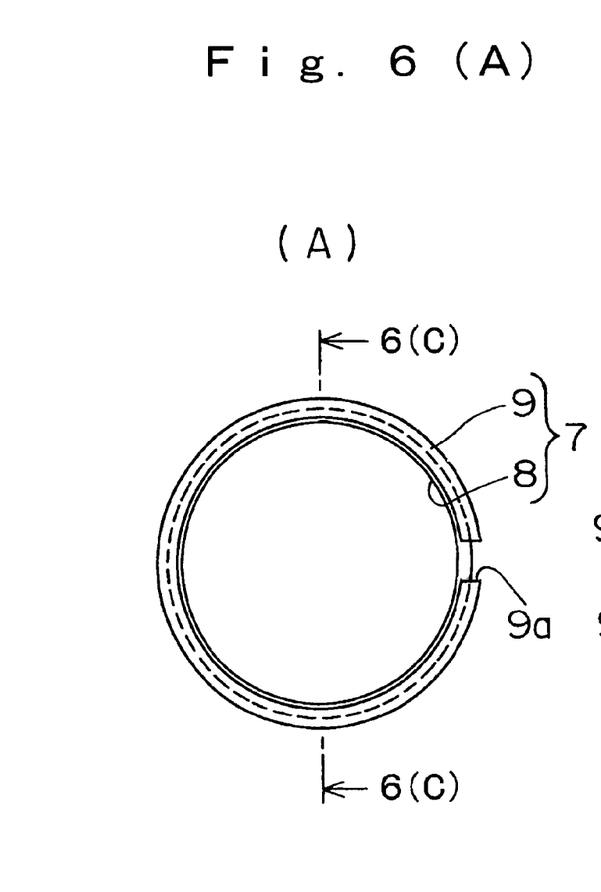
FIG. 6(A) is an end view of the assembled friction ring.
FIG. 6(B) is a side elevational view of the assembled friction ring of FIG. 6(A)
FIG. 6(C) is cross-sectional view taken on section plane 6(C)—6(C) in FIG. 6(A)

The friction ring 7 is formed by incorporating the steel ring 8 inside the resin ring 9, holding the steel ring 8 inside the resin ring 9 by means of the inwardly extending collars 9b on both ends of the resin ring 9, as shown in FIGS. 6(A), 6(B) and 6(C). When the steel ring 8 is incorporated inside the resin ring 9, the diameter of the resin ring tends to increase as a result of an outward biasing force applied by the steel ring 8. As shown in FIG. 3, the axial width L2 of the friction ring 7 is smaller than an axial width L1 of the annular groove 3b on the plunger 3. Therefore, when the friction ring 7 is fitted into the annular groove 3b, a predetermined axial clearance AC is formed between the friction ring 7 and the annular groove 3b.

In the assembly of the hydraulic chain tensioner shown in FIG. 2, the check valve 6 is first incorporated into the bottom portion of the plunger-accommodating hole 2a of housing 2. Then, a subassembly, composed of the plunger 3, the plunger-biasing spring 4 and the friction ring 7, is installed in the housing. The subassembly is put together by inserting the plunger-biasing spring 4 into the hollow portion 3a in the plunger. The friction ring 7 is fitted into the annular groove 3b on the plunger 3 while temporarily increasing the diameter of the ring in order to fit it onto the plunger. When the friction ring is fitted into the annular groove 3b, the outer diameter of the friction ring 7 is larger than the outer diameter of the plunger 3, and the inner diameter of the friction ring 7 is larger than the diameter of the bottom of the annular groove 3b. The subassembly is inserted into the plunger-accommodating hole 2a. Here, since the outer diameter of the friction ring 7 is larger than the inner diameter of the plunger-accommodating hole 2a when the friction ring is its relaxed condition, the insertion of the subassembly into the plunger-accommodating hole 2a is carried out while a force is applied to the friction ring causing its diameter to be reduced temporarily. In the insertion process, the outer circumferential surface of the resin ring 9 becomes pressure-welded to the inner circumferential surface of the plunger-accommodating hole 2a. The insertion of the subassembly is carried out by overcoming sliding friction between the outer circumferential surface of the resin ring 9 and the inner circumferential surface of the plunger-accommodating hole 2a.

As mentioned above, a predetermined axial clearance AC is formed between the friction ring 7 and the annular groove 3b. As shown in FIG. 3, a predetermined radial clearance RC is also formed between the inner diameter of the friction ring 7 and the bottom of the annular groove 3b. Since the outer circumferential surface of the resin ring 9 is pressure-welded to the inner circumferential surface of the plunger-accommodating hole 2a, the subassembly, including the plunger 3, is held in the plunger-accommodating hole 2a with sufficient force that it is not likely to be dislodged from the housing and dropped.

A force presses the plunger in the retracting direction as a result of an increase in tension in chain 103 during operation of an engine. If the pressing force exceeds the total force exerted by the plunger-biasing spring 4 and the oil pressure within the high-pressure oil chamber 5, the plunger 3 is moved in the retracting direction to a position where the total force and the pressing force are balanced. The position at which the forces are balanced is normally within the range of the predetermined axial clearance AC. Since the outer circumferential surface of the resin ring 9 is pressure-welded to the inner circumferential surface of the plunger-accommodating hole 2a, and a predetermined radial clearance RC is formed between the inner diameter of the friction ring 7 and the bottom diameter of the annular groove 3b, the friction ring 7 does not move backward together with the plunger 3. The backward movement of the plunger 3 proceeds slowly because of the buffering action of the oil in the high-pressure oil chamber 5, resulting from the leakage of oil to the outside of the housing through the clearance between the inner circumferential surface of the plunger-accommodating hole 2a and the outer circumferential surface of the plunger 3.

On the other hand, when slack occurs in the chain 3 the plunger moves forward within the range of the predetermined axial clearance AC as a result of the combined biasing force applied by spring 4 and the force applied by the oil pressure in the high-pressure oil chamber 5. Here again, the friction ring 7 does not move forward together with the plunger 3. Thus, within a given range of plunger movement corresponding to the axial clearance AC, the plunger 3 can move forward and backward readily, being influenced only by the force applied as a result of chain tension and the forces applied by the biasing spring 4 and the oil pressure in the high pressure oil chamber. Within this limited range of movement the plunger moves back and forth with excellent responsivity.

When the engine is started, during the short time before pressure is built up in the oil in the high pressure oil chamber, the chain can apply a significant force urging the plunger in the retracting direction. In this case, the plunger can be pushed backward beyond the range allowed by the predetermined axial clearance AC. When this occurs, the forward end surface of the friction ring 7 is pressed by the adjacent end surface of the annular groove 3b of the plunger, and the friction ring 7 is moved backward together with the plunger 3. When the friction ring 7 is moved backward, friction between the outer circumferential surface of the resin ring 8 and the inner circumferential surface of the plunger-accommodating hole 2a resists backward movement of the plunger 3. Consequently, the chain 3 loosens only to the small extent permitted by backward movement of the plunger 3. Therefore, as the engine is started, the generation of a large amount of slack in the chain is avoided, and backlash and fluttering of the chain generated just after engine start-up are suppressed.

Because backward movement of the plunger 3 is restricted by the resin ring 8, wear of the inner circumferential surface of the plunger-accommodating hole 2a is reduced. Therefore, even if the housing 2 is composed of an aluminum alloy, an increase in the gap between the ring and the inner circumferential wall of the plunger-accommodating hole due to wear is suppressed. Consequently, reduction of the frictional holding force between the inner circumferential wall of the plunger-accommodating hole 2a and the outer circumferential surface of the plunger 3 is also suppressed.

When the forward and backward movement of the plunger 3 is small during operation of an engine and within the range of the axial clearance AC, the plunger 3 moves forward or backward without movement of the friction ring. In this case, the plunger 3 exhibits excellent responsivity.

On engine start-up, the retracting movement of the plunger 3 is restricted by frictional resistance between the outer circumferential surface of the resin ring 8 and the inner circumferential surface of the plunger-accommodating hole 2a. Thus, even on engine start-up, a large amount of slack in the chain 103 is avoided, and backlash and fluttering of the chain are suppressed.

Because the resin ring 8 is in frictional contact with the inner circumferential surface of the plunger-accommodating hole 2a, wear of the plunger-accommodating hole is significantly less than the wear produced by the steel ring in the above-mentioned prior application Ser. No. 11/083,411. Even if the housing 2 is composed of an aluminum alloy, the gap between the inner circumferential wall of the plunger-accommodating hole 2a and the outer circumferential surface of the plunger 3 does not increase rapidly as a result of friction, and the holding force exerted on the plunger 3 is maintained.

In the above-mentioned conventional chain tensioner of U.S. Pat. No. 6,935,978, in order to restrict backward movement of the plunger, a plurality of engagement grooves on the outer circumferential surface of the plunger, and an annular guide groove forming a first stopper, must be formed to restrict backward movement of the plunger. With the present invention, however, it is only necessary to produce an annular groove on an outer circumferential surface of the plunger. Consequently, a significant reduction in manufacturing cost can be realized.

Since the conventional chain tensioner restricts the backward movement of the plunger by causing an engagement groove to engage with the first stopper through a register ring, the design of conditions such as the shape and material of the register ring requires a significant amount of study. On the other hand, since in the present invention, the backward movement of the plunger 3 is restricted by friction between the outer circumferential surface of the resin ring 8 and the inner circumferential surface of the plunger-accommodating hole 2a, significant simplification of the design of the tensioner can be realized.

Figure 7:
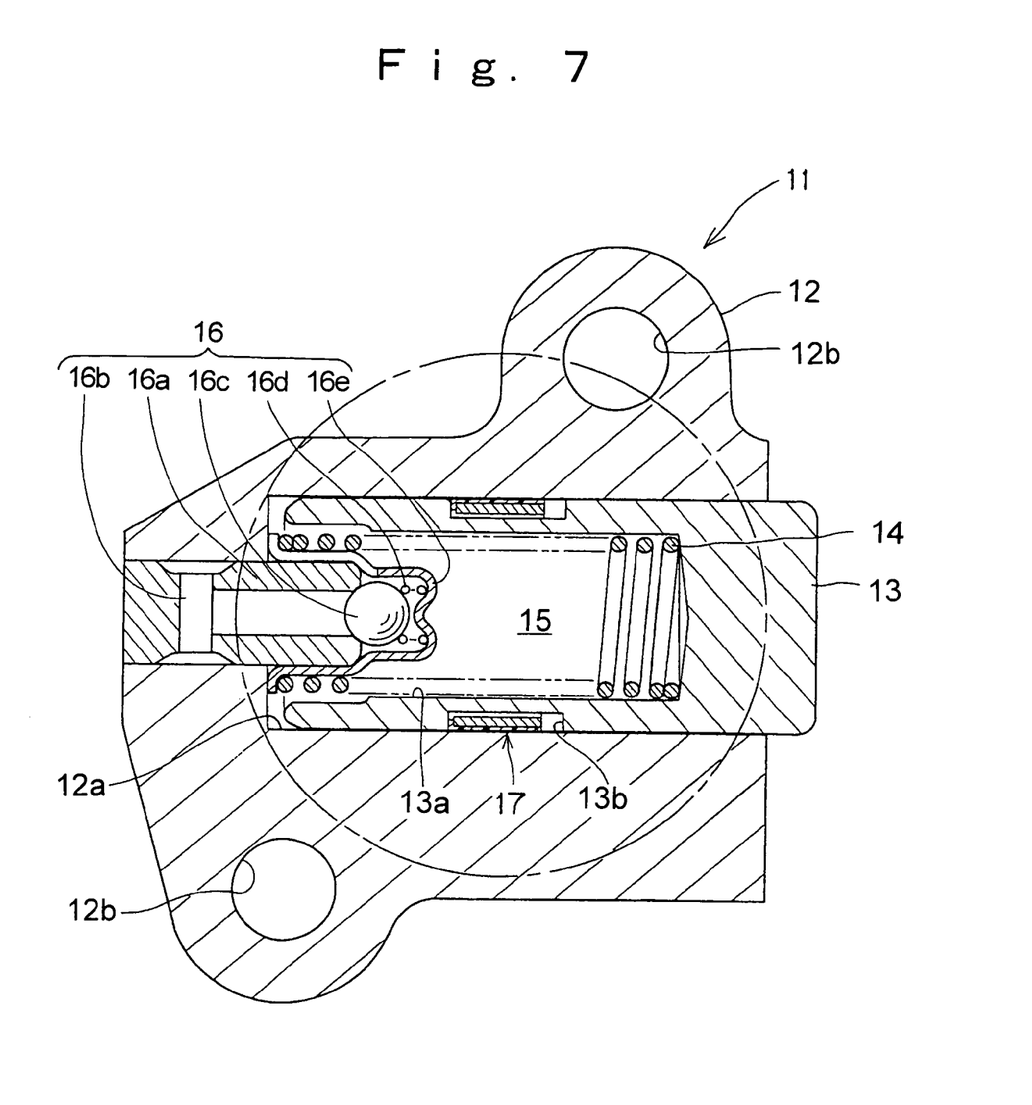
FIG. 7 is a cross-sectional view of a hydraulic chain tensioner in accordance with a second embodiment of the invention.

In a second embodiment of the invention, depicted in FIGS. 7–11(C), a hydraulic chain tensioner 11 comprises a housing 12, a plunger 13, a plunger biasing spring 14, a high-pressure oil chamber 15, a check valve 16 and a friction ring 17 as shown in FIG. 7.

The hydraulic chain tensioner 11 shown in FIG. 7 differs from the hydraulic chain tensioner shown in FIG. 2 only in that it uses a friction ring 17 instead of the friction ring 7.

The friction ring 17 is composed of a steel ring 18 and a resin ring 19.

The steel ring 18 has an oblique slot 18a, as shown in FIGS. 9(A) and 9(B), and is rectangular in cross-section. The steel ring 18 is cylindrical in shape and exhibits elasticity in the radial direction. In its relaxed condition, the inner diameter of the steel ring 18 is larger than the bottom diameter of the annular groove 13b formed on the outer circumference surface of the plunger 13. The material of the steel ring 18 can be selected from steels having appropriate spring properties.

The resin ring 19 has a cylindrical shape, and has a thin wall as shown in FIGS. 10(A) and 10(B), and has an inwardly extending collar 19b at only one of its ends. The resin ring 19 has an axial slot 19a, which allows the diameter of the resin ring to increase. The material of the resin ring 19 can be selected from engineering plastics having appropriate friction coefficients for example.

Figure 8:
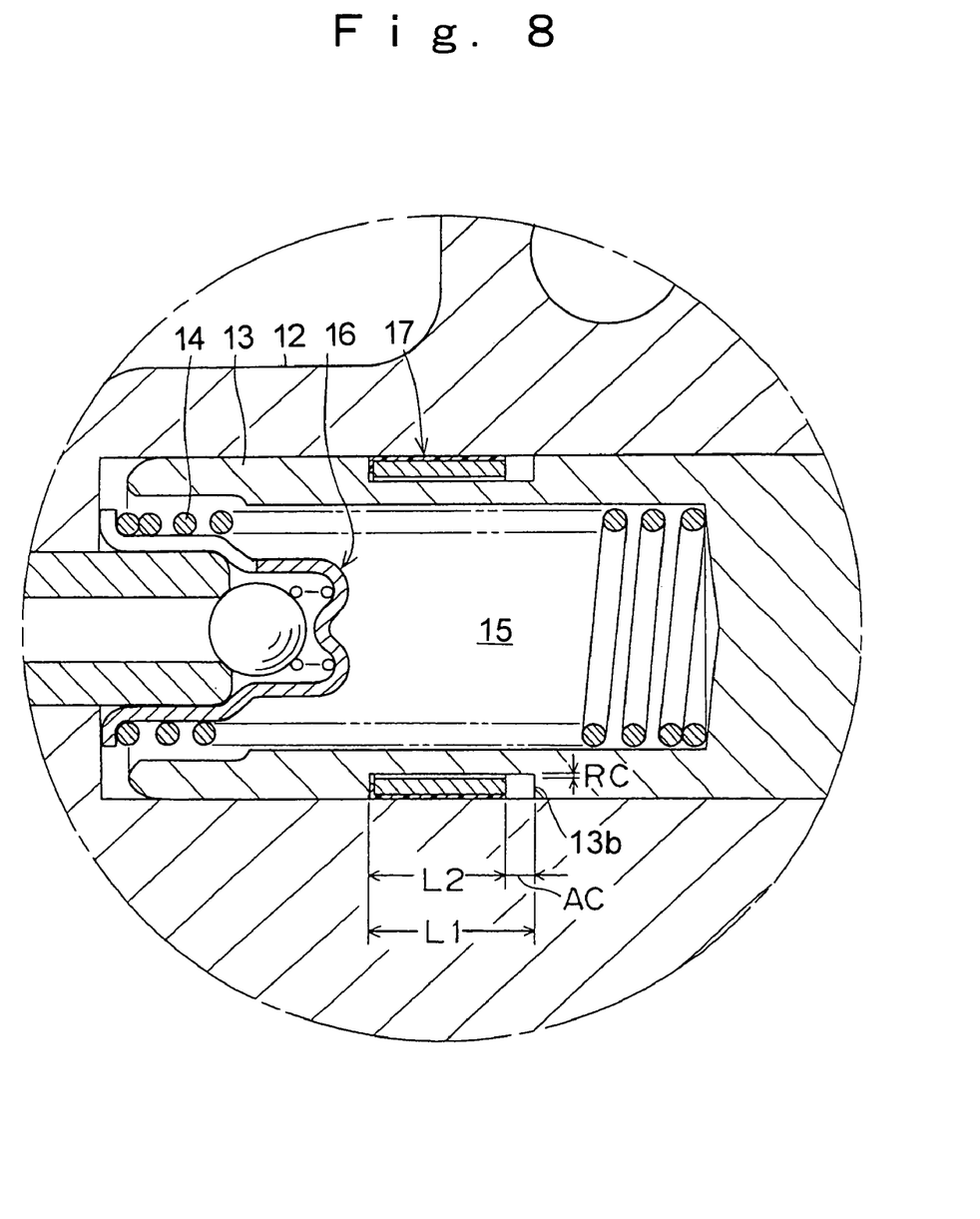
FIG. 8 is an enlarged cross-sectional view of a portion of the tensioner outlined by a circle shown as a broken line in FIG. 7, showing a friction ring.
Figure 9:
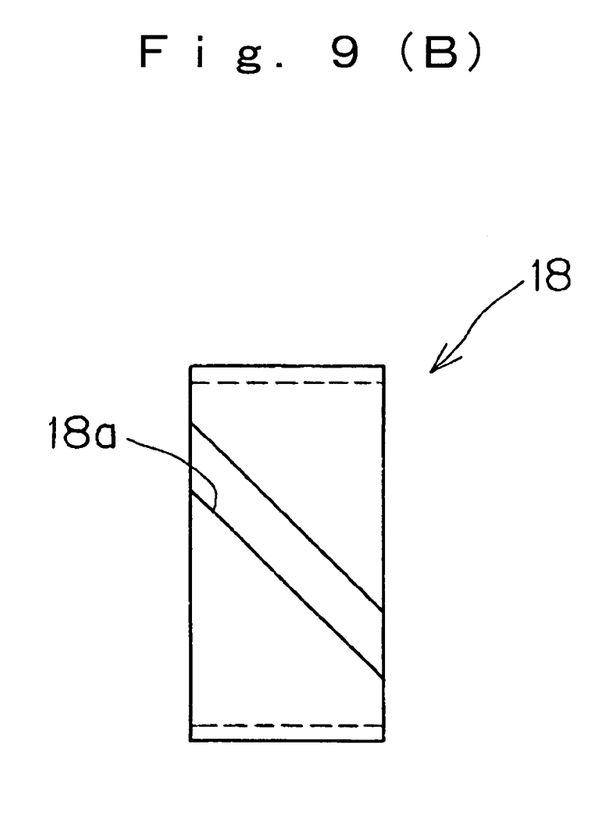
FIG. 9(A) is an end view of a steel ring used in the friction ring in FIG. 8.
FIG. 9(B) is a side elevational of the steel ring of FIG. 9(A)
Figure 10:
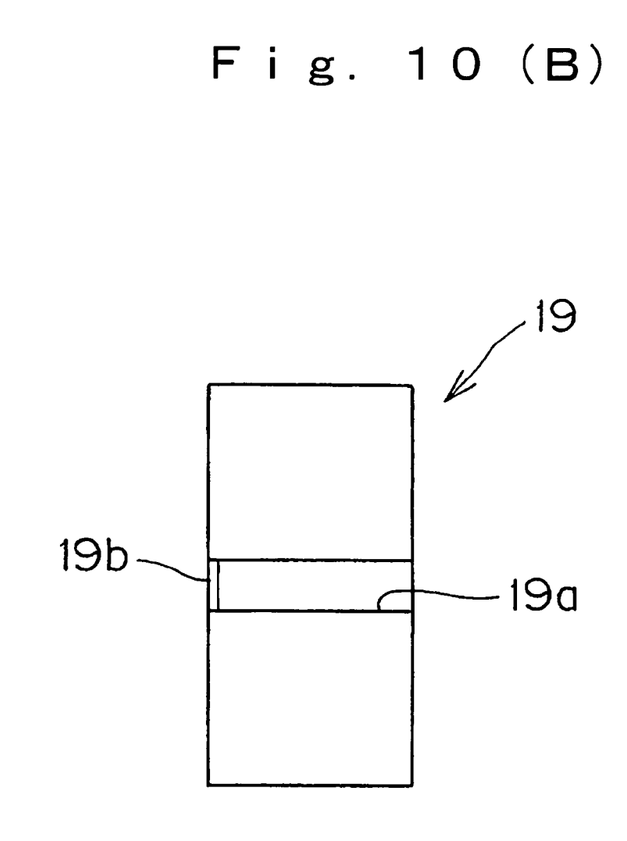
FIG. 10(A) an end view of a resin ring used in the friction ring in FIG. 8.
FIG. 10(B) is a side elevational view of the resin ring of FIG. 10(A)
Figure 11A:
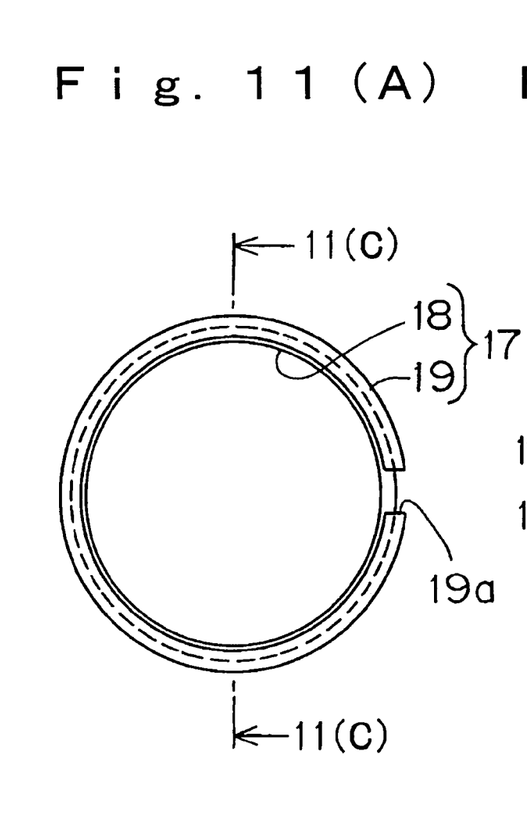
FIG. 11(A) is an end view of the assembled friction ring of FIG. 8.
Figures 11B, 11C:
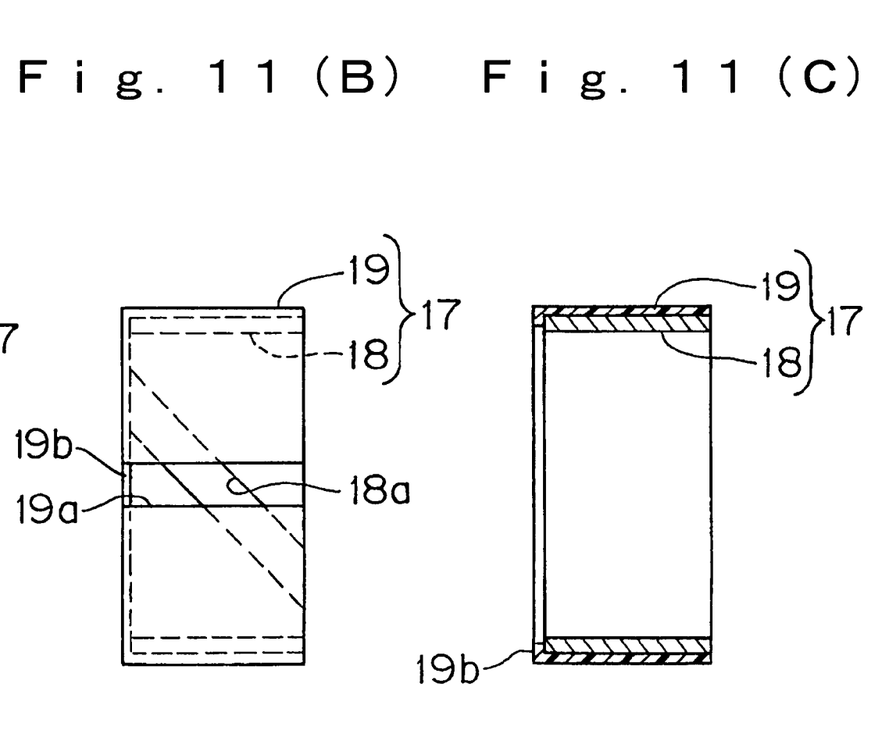
FIG. 11(B) is a side elevational view of the ring of FIG. 11(A)
FIG. 11(C) is cross-sectional view taken on section plane in 11(C)—11(C) in FIG. 11(A).

The friction ring 17 is formed by incorporating a steel ring 18 inside the resin ring 19, and holding the steel ring 18 inside the resin ring 19 by means of the inwardly extending collar 19b at one end of the ring 19, as shown in FIGS. 11(A), 11(B) and 11(C). When the steel ring 18 is incorporated inside the resin ring 19, the diameter of the resin ring 19 is increased by an outward biasing force exerted of the steel ring 18. As shown in FIG. 8, the axial width L2 of the friction ring 17 is smaller than the axial width L1 of the annular groove 13b of the plunger 13. Therefore, when the friction ring 17 is fitted into the annular groove 13b, a predetermined axial clearance AC exists between the friction ring 17 and the groove 13b.

The assembly and effects of the hydraulic chain tensioner 11, shown in FIG. 7, are the same as the assembly and effects of the hydraulic chain tensioner 1 shown in FIG. 2.

Since the resin ring 19 of the hydraulic chain tensioner 11 has its inwardly extending collar 19b only at one end, it is easier to mold than the resin ring 9 of the first embodiment.

The invention is applicable to various kinds of hydraulic chain tensioner, including not only tensioners having mounting flanges as shown, but also tensioners having other mounting features.

I claim:

1. A hydraulic chain tensioner comprising:
   a housing having a plunger-accommodating hole with a cylindrical wall;
   a hollow cylindrical plunger slidable in said plunger-accommodating hole and having a protruding portion protruding forward from said plunger-accommodating hole in a protruding direction for receiving a force urging the plunger in a retracting direction opposite to said protruding direction, said plunger having an outer circumferential surface, and said plunger and said plunger-accommodating hole forming a high pressure oil chamber;
   a plunger-biasing spring, urging said plunger in said protruding direction;
   a check valve in said housing, allowing oil to flow from a source of oil under pressure into said high-pressure oil chamber and blocking reverse flow of oil;
   an annular groove formed on the outer circumferential surface of said plunger, said groove being within the interior of said plunger-accommodating hole and having a groove bottom opposed to, and spaced from, said cylindrical wall; and
   a friction ring, composed of a resin ring and a steel ring incorporated into the inside of the resin ring, fitted into said annular groove, the outer diameter of the friction ring being larger than the inner diameter of the plunger-accommodating hole when the friction ring is in its relaxed condition, and the steel ring exerting an outward biasing force tending to increase the diameter of the resin ring, said outward biasing force being sufficient to cause the outer circumferential surface of said resin ring to be pressure-welded to said cylindrical wall of the plunger-accommodating hole;

wherein the friction ring fits into said annular groove with a radial clearance between the friction ring and the groove bottom, and with an axial clearance located forward of the friction ring at least when the force exerted on the plunger by the plunger-biasing spring exceeds the force, received by the protruding portion of the plunger, urging the plunger in the retracting direction;

wherein the friction between the outer circumference of the resin ring and the cylindrical wall of the plunger-accommodating hole, resulting from pressure-welding, is sufficient that the plunger can move relatively freely, relative to the resin ring, in the protruding and retracting directions within a range equal to said axial clearance, but moves less freely, with the ring, in the protruding and retracting directions beyond said range; and wherein the friction force between the outer circumferential surface of the resin ring and the cylindrical wall of the plunger-accommodating hole prevents the plunger from being dislodged from the plunger-accommodating hole by the force exerted by the plunger-biasing spring.

* * * * *